Feb. 8, 1938. W. S. RUSSELL 2,108,021
WATER TREATMENT
Filed March 29, 1934 4 Sheets-Sheet 1

FIG. I.

INVENTOR
WILLIAM S. RUSSELL
BY
Arthur Middleton
ATTORNEY.

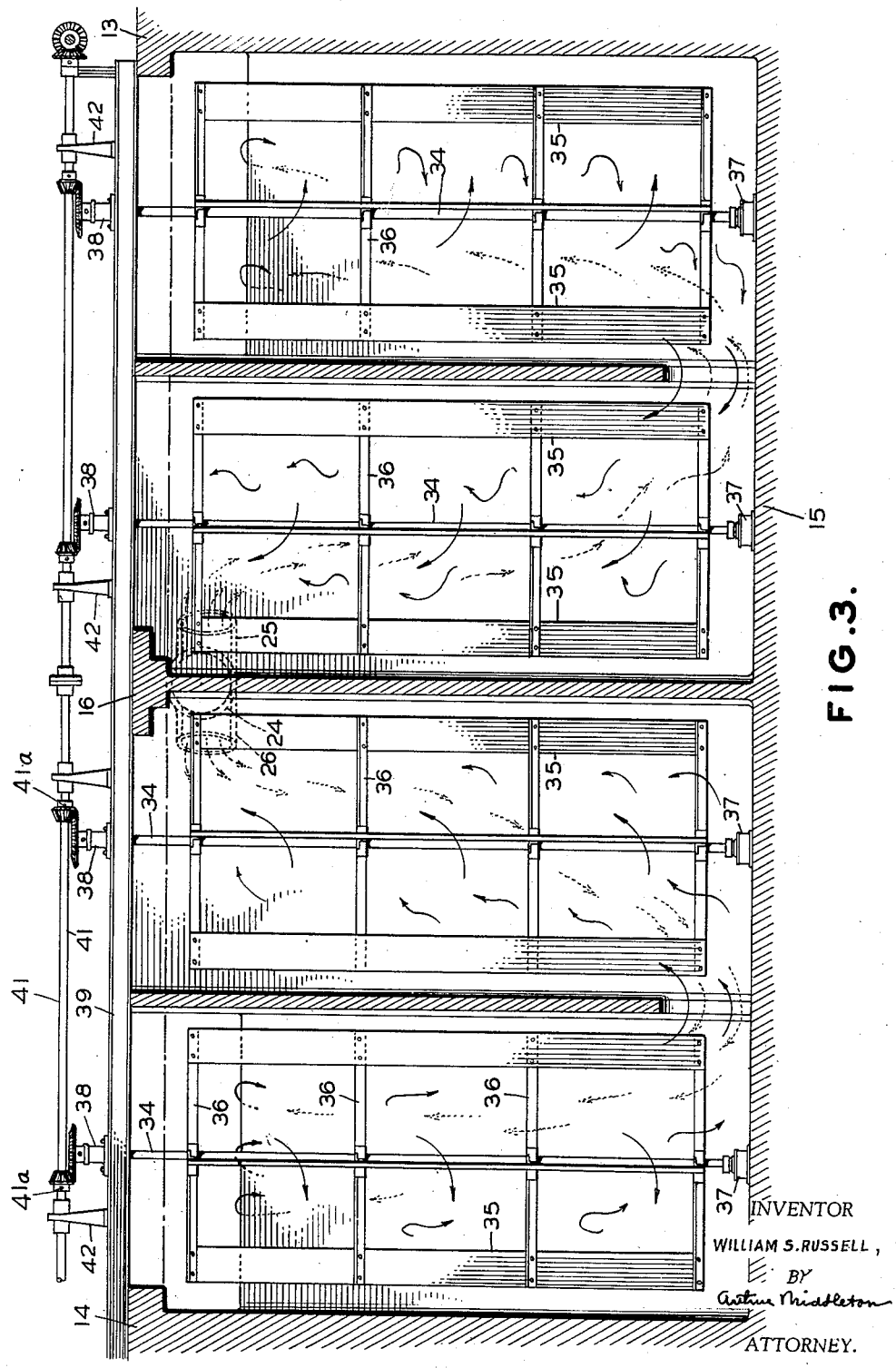

Feb. 8, 1938.　　　W. S. RUSSELL　　　2,108,021
WATER TREATMENT
Filed March 29, 1934　　　4 Sheets-Sheet 4
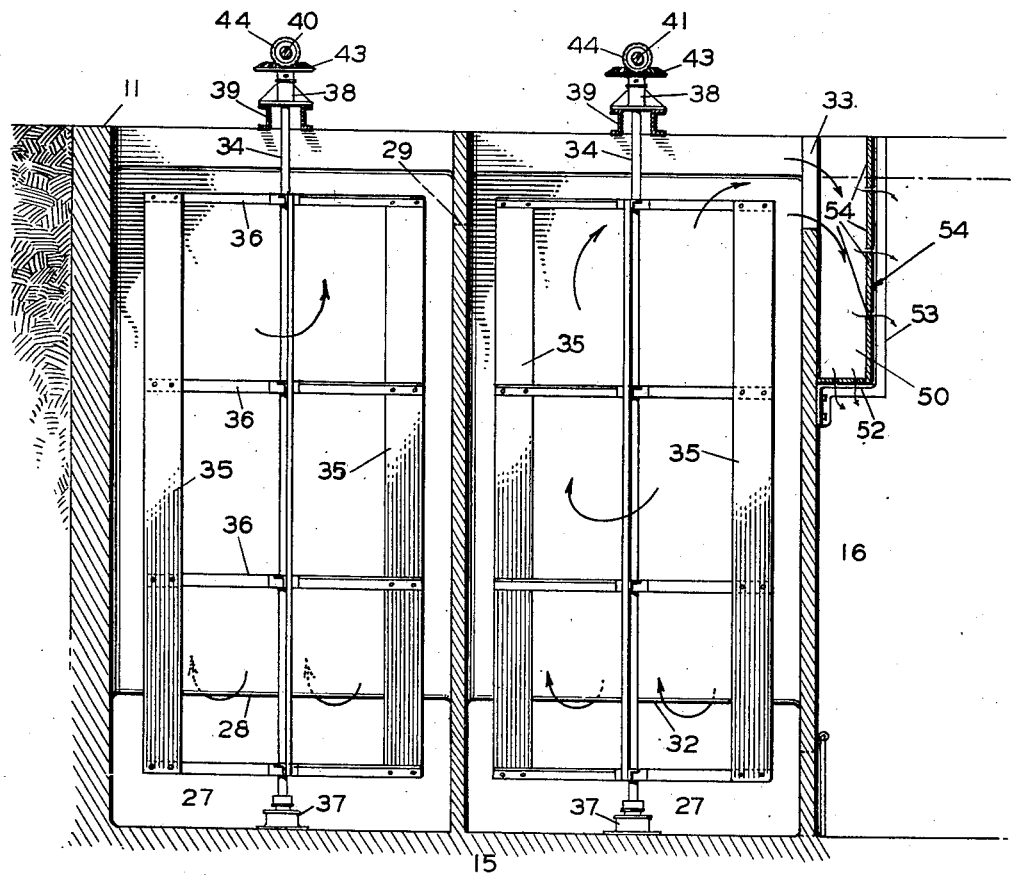
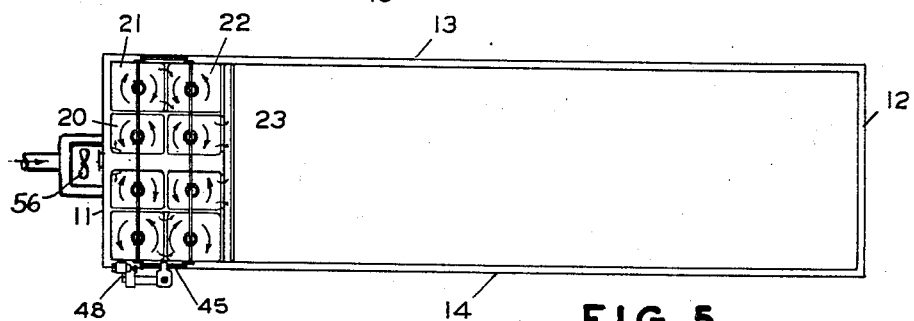
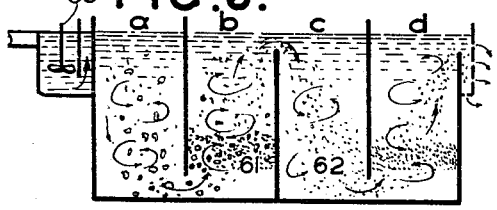
INVENTOR
WILLIAM S. RUSSELL
ATTORNEY.

Patented Feb. 8, 1938

2,108,021

UNITED STATES PATENT OFFICE

2,108,021

WATER TREATMENT

William S. Russell, Salem, Va., assignor to The Dorr Company, Inc., New York, N. Y., a corporation of Delaware Application March 29, 1934, Serial No. 717,968

4 Claims. (Cl. 210—12)

This invention relates broadly to the clarification of turbid liquids by way of flocculation of the impurities or particles of turbidity and their subsequent removal from the liquid by sedimentation. In more concrete terms, this relates to an arrangement or combination in which the stream of liquid to be treated flows through an agitating or solids coagmenting operating zone in which there is effected the formation of the solids or coagulated impurities into settleable flocs, and from that operating zone is delivered into an adjoining quiescent zone where the properly formed flocs may settle upon the bottom. More specifically, this relates to an improved and peculiar system of floc treatment as by a certain floc movement and agitation, which is effective to produce flocs in the flocculating zone of improved settling characteristics.

Whereas, in the following, reference will be made largely to the process of water purification specifically, this invention is understood to cover beyond such embodiment all similar steps in the treatment of other liquids, for instance sewage, water, trade-wastes, etc., which correspond in character to the ones herein described and respond to the method of treatment herein contemplated.

In the process of water purification, the water, preliminary to its treatment in the agitating step, is generally dosed with a suitable chemical or coagulant, such as alum, to induce flocculation. The dosing step initiates the process of flocculation in that it brings about the coagulation of impurities in the turbid liquid or in other words the creation of certain nuclei as a basis for the formation of prospective settleable flocs, whereas a subsequent agitating step is conducted in a manner as to encourage and to realize the coagmentation of the coagulated solids into settleable flocs. This step of agitation is designed to build up flocs of agglomerated solid impurities or particles of turbidity to a size and quality best suited to bring about the sedimentation thereof as efficiently and completely as possible. The state of agitation herein contemplated as being desirable for the purpose on hand may be termed as one of mobile or mobilized suspension of the solids whereby there is effected the coagmentation of the solids as by way of gentle collisions therebetween to condition them into settleable flocs.

The amount of chemical or coagulant required for this purpose represents a considerable expense item in the operation of a liquid clarification plant. Therefore, one object of this invention is to effect a saving in chemicals or dosing agent by an improved control of floc formation. Another object is to produce in the agitation or coagmentation zone a type of floc having such settling qualities that the maximum time of its subsidence in the settling zone is curtailed to an extent which affords a reduction of tank size and consequently a saving in cost of tank construction, excavation and ground space. Another object is to produce a horizontally arranged agitation and sedimentation unit with a minimum requirement of ground space, and which is reliable, efficient and economical in first cost and operation. Other objects are to afford a more positive control of the sedimentation step by producing from the flocculating zone, flocs of substantially uniform characteristics; and to devise an agitating mechanism for the flocculating zone of great simplicity, reliability and flexibility of operation; also to produce flocs of improved filterability wherever it be chosen that the settled sludge be filtered; and to decrease the percentage of wash water used by lightening the filter load.

To attain its ends of increased overall efficiency, the invention contemplates the avoidance of the formation of flocs below a given size or the release of undersized flocs into the sedimentation zone, in view of the fact that such undersized flocs require considerable settling space in excess of that required for settling the bulk of the larger sized flocs, and that such undersized flocs tend to lower the efficiency of the settling compartment and of the purification step in general. In other words, this invention aims to narrow down to a point of substantial uniformity the spread of floc sizes to be delivered from the agitation or mechanical flocculation zone. The problem then is not primarily one of building up large or maximum size flocs, but rather to prevent the formation and delivery of an appreciable percentage of certain small size or undersize flocs or their escape respectively into the sedimentation zone.

Hence a novel method and means of flocculation of this invention produces coagulation of the solid impurities of the liquid to be clarified into flocs of a substantially uniform size and substantially uniform settling characteristics, whereby the floc size produced represents an average between certain large or oversize and certain small or undersize flocs. Due to their uniform character and narrow spread of sizes, substantially all the flocs so produced will consequently settle within a smaller, more compact, and more clearly defined zone. Consequently, such improvements in the control of floc formation will permit of a corresponding shortening of settling tank space, while liquid of a required purity is produced, and the amount of chemical conditioner needed is kept at a minimum.

Broadly, this invention is characterized in that it does not rely on any of the known steps of floc or sludge return to stimulate flocculation with the attendant risk or nuisance of having a proportion of fine flocs short-circuit from entrance to exit of the flocculating zone without insurance of sufficient detention. More specifically, this does away with the known practice of floc or sludge recirculation through pipes in view of the floc disintegrating effect which is believed to be due to certain conditions of flow and friction prevailing in such pipes. The invention proposes to send the conditioned and floc laden liquid, without substantial flow restriction, through a sequence or series of floc equalizing stages, thereby securing from the flocculating zone a floc product of the desired uniform character, without involving such uncertainties as are due to the premature and uncontrolled escape of undersize flocs.

To this end, the floc treatment phase of the invention avails itself of a phenomenon which lies in the compound effect of certain floc movement plus controlled agitation in the flocculating zone. Accordingly, the floc laden stream is allowed to ascend through a rising section of its bed or channel or path, permitting gravity to delay certain large size flocs in their upward transit relative to the velocity of the stream. A crowding up, particularly in the lower portion of this section, will then occur creating what might be called a floc treatment zone of concentrated or relatively dense suspension, or floc screen, or blanket. In order to prevent this floc screen from becoming stagnant and an obstacle to a continued upward transit of flocs, suitable agitation is superimposed upon this condition, preferably by means of a vertical paddle shaft in the rising leg, cell or section. This compound effect is to render positive the desired phenomenon of floc control. This floc screen then manifests an averaging or equalizing effect upon the flocs, insofar as it tends to reduce oversize flocs, while on the other hand giving undersize flocs a chance to coagmentate as they pass through this equalizing zone. There appears to take place in this zone, a certain transposition or transmutation of floc sizes, to the effect that flocs of a certain spread of sizes enter this equalizing zone, to emerge therefrom with a narrower spread caused by the peculiar compound effect of gravity detention plus certain suitable agitation.

In view of the foregoing characterization, features of the invention are said to reside largely in the method and means for operating the flocculating zone to the end of controlling or equalizing the spread of floc sizes; more specifically they reside in the arrangement of a battery of flocculating compartments through which a floc laden stream of liquid may pass along a serpentine path in an up and down zigzagging fashion, in the arrangement of suitable agitating or mechanical flocculating mechanism therefor, and further, in the arrangement of a stilling or distributing zone to effect a smooth and efficient transition of the flocculated liquid from the agitating into the sedimentation section of the tank.

Another feature resides in the provision of a purification unit, adapted to intercept agitative disturbances from the agitation section and yet of a permeability for the floc-laden stream to permit its transfer into the sedimentation section in a desired freely drifting manner; that is to say, substantially without altering or impairing the settling characteristics of the flocs as attained in the agitation section.

According to another feature, the liquid is treated in one or a plurality of floc conditioning stages. The liquid flows in a one-way or uniflow fashion from entrance to exit of a flocculating zone. A sequence of connected cell-like sections provides for a sufficient length of flow for the liquid to afford sufficient opportunity to convert the initial wide spread of floc sizes into the desired narrower spread between inlet and outlet of the flocculating zone. Sufficient flow length is provided in a compact space by arranging a sequence of substantially upright interconnected cell sections juxtaposed to each other, thereby providing a desirable number of stages for step-wise floc conditioning. Suitable agitating means, interposed in the cell sections, are conducive to effect, in a positive manner, the desired floc treatment, and also to render positive the transit of the flocs along their meandering or zigzagging path.

According to another feature, the tank space allotted to the flocculating zone is divided into an even number of compartments preferably by cross-partitioning or baffling; the stream of liquid having coagulated solids therein is allowed to enter at the top of one compartment and, flowing downward, enter the next adjoining compartment through a passage underneath the partition. A downward section, followed by an upward section or column may thus be said to constitute a pair of flocculating cells or elements in the flocculating zone, and a desirable number of elements may thus be composed to form a battery of flocculating or floc treatment elements, each of which is substantially U-shaped. Such a battery may be compacted into a minimum of ground space by having rows of these elements arranged side by side. Simple individual mechanical agitators may extend down into each compartment from the top thereof.

Another feature provides a vertical paddle shaft in the compartment. The paddles in one compartment of a pair rotate in a direction opposite to the rotation of those in the following compartment of the pair, in order to effect a substantially smooth transition or tangential merging of liquid from the range of one paddle shaft through the interconnecting opening into the range of the next paddle shaft. In this way the liquid enters the range of action of a paddle shaft substantially without objectionable floc disintegrating impact.

With the respective tank spaces for flocculation and sedimentation compacted and reduced to a desirable minimum, another feature interposes a stilling or distributing zone between the two sections. That is to say, a zone of transition designed to operate with a minimum of losses compensates for the difference in the respective widths of the stream that leaves the agitating space, and of the sedimentation space. This intermediate stilling zone may be defined by the limitations of a troughlike structure or baffle wall which extends transversely of the tank, and culated liquid over the width of the sedimentation zone.

The invention possesses other objects and features of advantage, some of which with the foregoing will be set forth in the following description.

In the accompanying drawings, there has been illustrated the best embodiments of the invention known to me, but such embodiment is to be regarded as typical only of many possible embodiments, and the invention is not to be limited thereto. In the drawings:

Fig. 3 is a cross-sectional view of the agitating division of the tank taken upon line 3—3 of Fig. 2.

Fig. 4 is a longitudinal section of the agitating division of the tank taken upon line 4—4 of Fig. 2.

Fig. 5 is a diagrammatic top view upon the total tank arrangement.

Fig. 6 is a diagram to show the stagewise floc treatment according to this invention in a sequence of agitating compartments.

Figure 1:
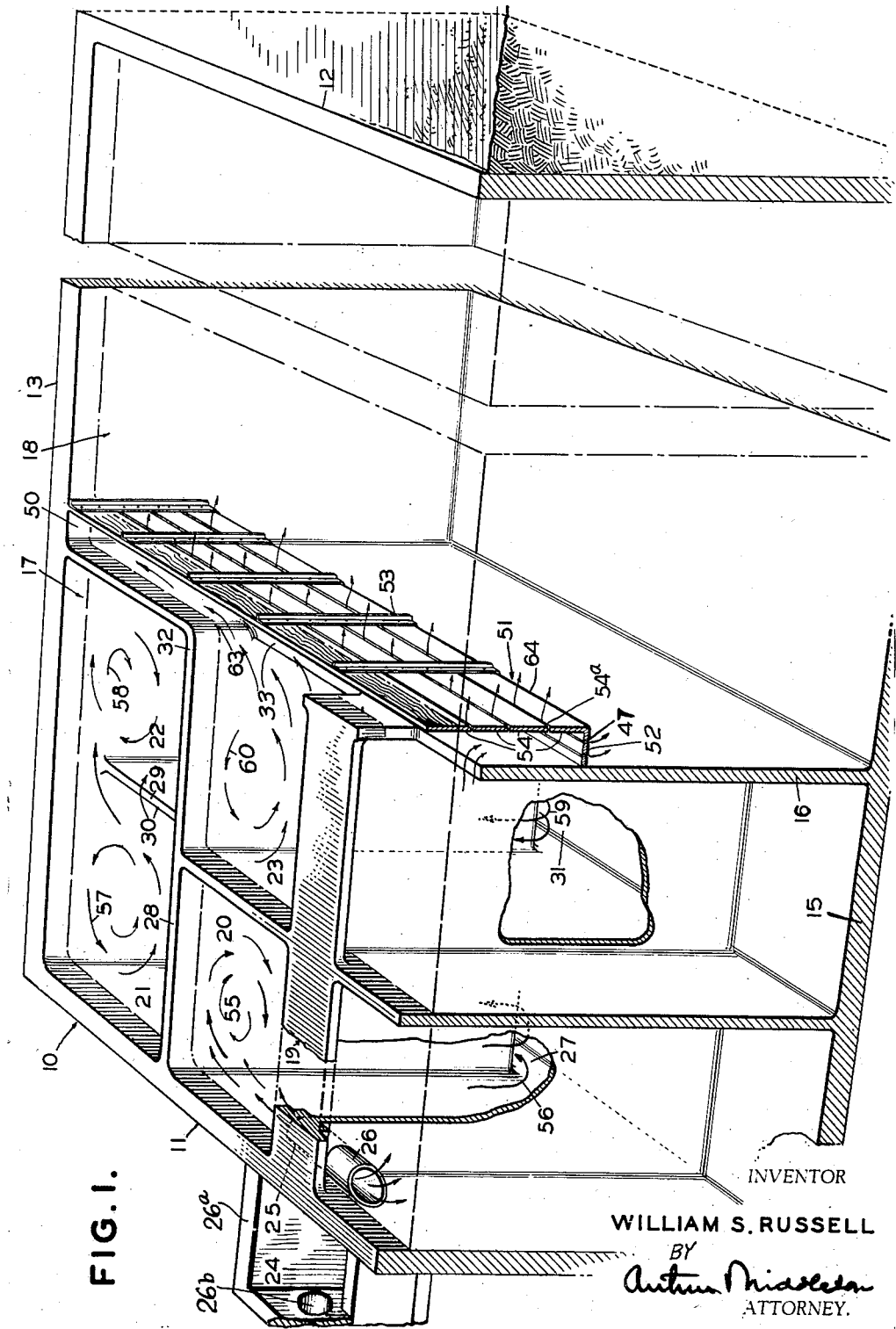
Fig. 1 is a part-sectional perspective view of the preferred tank arrangement with parts broken away for a clearer showing of the system of flow.

The preferred tank arrangement for treating a flow of liquid according to this invention (see particularly Fig. 1), comprises a substantially rectangular tank structure 10 having a front wall 11 and a rear wall 12, and side walls 13 and 14 respectively, and a bottom 15. A partition wall 16 divides the tank into an agitating section 17 and a sedimentation section 18. A system of partitions divides the agitating section into a number of individual agitating compartments. By virtue of a central division wall 19, four agitating cells or compartments 20, 21, 22, 23, are grouped into an independent unit at each side of the wall 19. The compartments of each such unit are interconnected in series. A feed inlet conduit at the top of the front wall 11 splits into feed openings 25 and 26 to feed each group of agitating compartments. A mixing chamber 26a with an inlet 26b is provided ahead of the feed-inlet openings 25 and 26, in which chamber there is to be effected the dosing and mixing of the incoming liquid with a conditioner for inducing the impurities or particles of turbidity in the liquid to coagulate prior to the formation or agglomeration thereof into flocs. There is a connecting passage or opening 27 at the bottom of a partition 28 between compartments 20 and 21. Compartment 21 is connected with compartment 22 through a recess or overflow connection 29 at the top of a partition 30. From the third compartment a connection leads into the fourth and last compartment 23 through a bottom passage 31 in a partition 32. An overflow recess 33 delivers the flow of liquid into the sedimentation section of the tank.

This arrangement of treatment stages is characterized by a substantially serpentine flow path, in other words by a series of alternately upwardly and downwardly directed main flow sections with transfer sections between the main flow sections separating one main flow section from another while providing for a substantially unobstructed and relatively unrestricted continuity of liquid flow for the solids carrying liquid stream to pursue whereby the coagmented solids may drift freely along with the stream from one section into the other. In passing from one main flow section into another the stream can be said to be passing through an interposed transfer section through which the solids are carried in suspension along with the stream as as result of the agitation maintained in the main flow sections.

Figure 2:
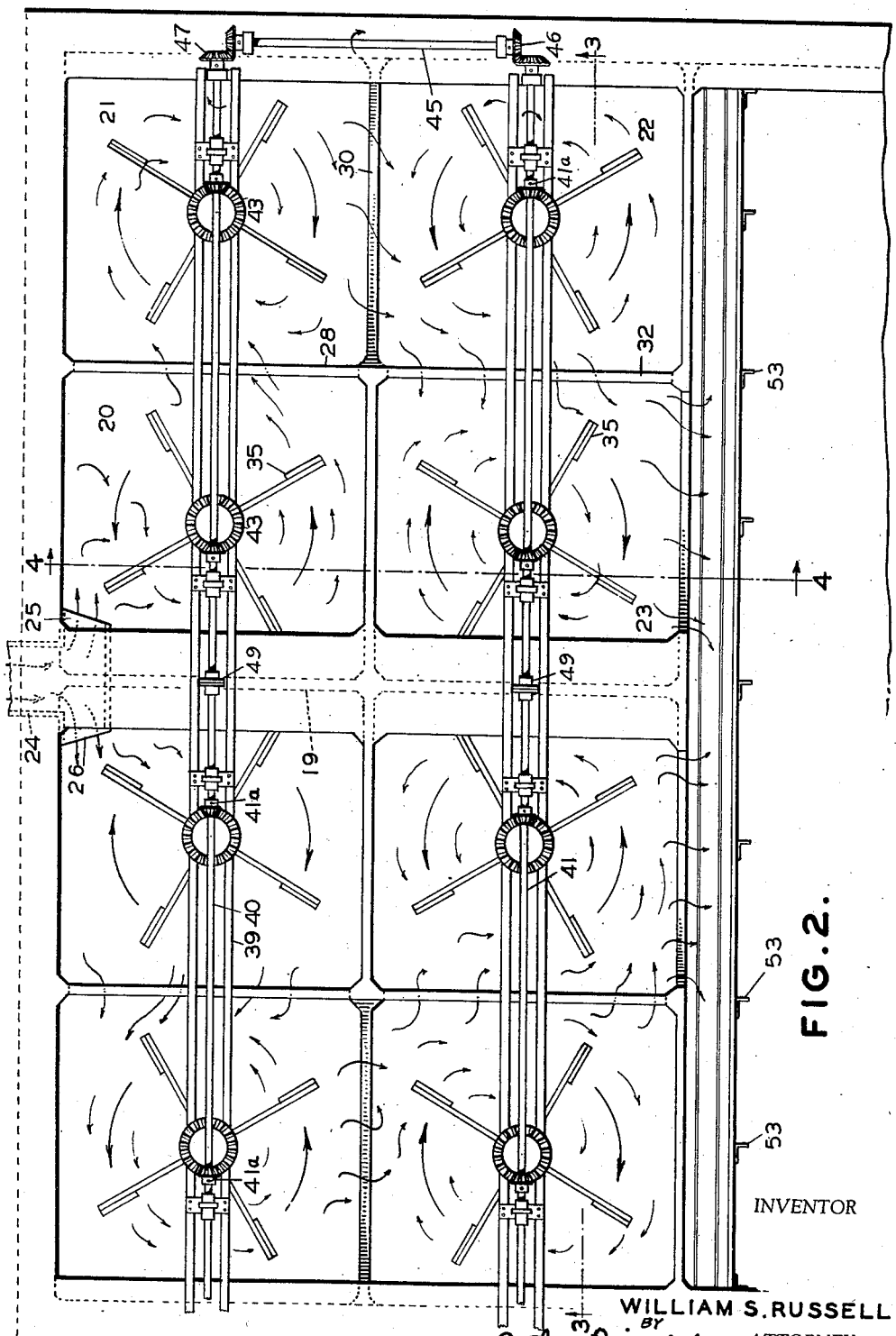
Fig. 2 is an enlarged top view of the agitating or flocculating division of the tank, in twin arrangement.

Agitating mechanism for the compartments 20, 21, 22 and 23, is shown in the detail Figures 2, 3, 4 and also in the diagram Fig. 5. Each of the compartments is provided with a vertical paddle shaft 34 which is shown to carry paddles 35. The paddles are in the form of longitudinal members extending parallel to the shaft and are fixed thereto by a number of horizontal arms 36 arranged at intervals upon the shaft. The foot of the paddleshaft 34 is guided in a bearing 37, while the top rests in a bearing 38. Since the compartments of the agitating section or zone 17 are arranged in rows alongside each other, channel irons 39 may overlie these rows to form the support for the top bearings 38. Although individual drive may be employed, the driving means shown for the agitators are substantially centralized. The horizontal drive shafts 40 and 41 respectively are carried in horizontal bearings 42 mounted on the channel irons 39 and supply driving power to a row of vertical paddleshafts 34 through the medium of bevel gear connections. The top end of each paddleshaft carries a large bevel gear 43 which meshes with a smaller bevel gear 44 fixed upon the horizontal drive shafts 40 or 41 respectively. The smaller bevel gear may be detachably fixed upon its shaft as by a set screw 41a, to allow for disconnection of the gearing.

As noted from Fig. 2, there are two transverse rows of agitating compartments in the tank, and accordingly there are arranged the two horizontal drive shafts 40 and 41. Both horizontal shafts in turn receive driving power from a common third shaft 45 through bevel gear connections 46 and 47 respectively. The diagrammatic top view of Fig. 5 shows, in addition, a driving motor arrangement 48 for the third shaft 45. A coupling or device 49 is shown to connect two sections of horizontal shafts 40 and 41, respectively.

Care is taken to have the smaller gears 44 arranged in such a way that each two paddleshafts 34 in the row will rotate in opposite directions or countercurrent fashion. As will be hereinafter explained, this facilitates the transfer or flow of the liquid in a suitable manner from one agitating compartment into the other.

Between the agitating section and the sedimentation zone of the tank is interposed a stilling or distributing zone. The liquid overflowing from the last agitating compartment 23 is intercepted and distributed by a transverse channel 50. The channel is formed by a vertical baffle wall 51 having an angular portion or bottom 52 joining the main partition wall 16 somewhat below the overflow from the agitating zone. More specifically this baffle structure or distributing wall comprises angular supporting members 53 fixed in the wall 16 and arranged to carry horizontally extending baffle boards or elements 54 which are shown to extend from side to side of the tank and to be spaced from each other in such a manner as to allow the liquid to pass through the slotted areas 54a thereof into the sedimentation zone.

The restricted flow from the agitating or floc treatment zone 17 is thus spread or diffused over the width of the sedimentation zone 18 in a number of superposed shallow streams for sedimentation. The liquid may leave the end of the sedimentation zone through an outlet not shown.

The operation of the tank arrangement just described appears most clearly from Figures 1, 5, and 6.

In describing the operation of this method, distinction is herein made between that phase of flocculation which comprises treating the impurities in the raw feed by dosing with a suitable chemical to effect their precipitation or formation into coagulated solids, and that phase thereof which comprises coagmenting the coagulated solids in a manner to encourage and effect their agglomeration or coagmentation and conditioning into readily settleable flocs. The operating requirements of both phases can be said to be antagonistic insofar as the initial or coagulation phase requires the spread or dispersal of the coagulant throughout a maximum volume within a minimum of time, whereas the subsequent coagmentation and amassment of the coagulated solids is to take place within a minimum of space along with a multitude of gentle but colliding contacts. Therefore, as a matter of practical operation the coagmentation step may benefit by rapid agitation, whereas the subsequent coagmentation takes place as a result of certain mild cycling action. That is to say, in the one instance it may be desirable to establish rapid relative motion between adjacent particles while the other requires slow substantially nondisruptive motion between adjacent particles.

Another aspect is that the mixing phase is concerned with the mixing of the chemical or coagulant liquid among the solids in the feed liquid, whereas in the flocculating phase it is desired to mix and contact one solid with other solids.

The liquid as a rule is initially dosed with a chemical reagent or coagulant to bring about initial formation of coagulated solids to the end of precipitating impurities. Arrangement is shown to have a swift and thorough mixing take place in the mixing chamber 26a of the coagulant or coagulant liquid with the water before it enters the flocculating zone 17 proper of the tank 10. A mixing propeller 56 for this purpose is diagrammatically indicated in Fig. 6.

The floc bearing liquid passes through the floc treatment section or zone 17 of the tank 10 where it undergoes a process of stepwise floc treatment which is to render the flocs initially formed more fit or conditioned for the subsequent step of sedimentation in section 18 of the tank.

The liquid feeds through the inlet conduit 24 and opening 25 into the top zone of the first agitating or floc treatment compartment 20 as shown in Fig. 1. The showing of the agitating or paddle mechanism has been omitted from Fig. 1; however, the movement of the liquid as induced by such agitation and by the trend of liquid flow has been indicated by a corresponding system of arrows.

The liquid entering at the top of the first agitating compartment 20 including the first and downwardly directed main flow section is drawn into path or gentle motion of the paddles therein which rotate in a clockwise direction therein as indicated by arrows 55. The flowing liquid with the flocs suspended therein spirals its way down to the bottom of the compartment where it reaches the passage 27 and is swept into the next compartment 21 including the second and upwardly directed main flow section (see arrows 56). Mechanical agitation is performed in the liquid of the vertical main flow sections in a direction substantially transverse of the general progressive flow direction of the stream therethrough, the agitation being carried out at a rate and in a manner that the solids are kept in individually mobile suspension whereby there results a multitude of gentle collisions therebetween for effecting the coagmentation of the suspended solids into settleable flocs. In the second compartment 21 the paddles move in counterclockwise direction, as indicated by arrows 57. The hydraulic conditions in the second compartment 21 and their effect upon floc formation differ from those prevailing in the first compartment 20. That is to say, in the first compartment the stream of liquid progresses downwardly in the direction of gravitation, thus giving the flocs as well as the carrier liquid substantially the same rate of progress under constant intermingling of the flocs in the downwardly progressing stream. In the second compartment 21 the upward flow direction of the liquid is opposed to the direction of gravitation and causes a certain delay in the transit of the flocs relative to the progress of the liquid. Something in the nature of a hindered settling condition thus created brings about the formation in this rising stream of a zone of denser floc suspension or screen or blanket. In other words there is caused to form, coincidental with the coagmentation of the suspended solids in the upwardly progressing flowing liquid body, a solids screen comprising a transverse horizontal zone of increased turbidity through which the liquid stream must pass. It seems that a relatively wide spread of floc sizes coming from the first agitating compartment enters this floc screen only to be converted therein into a narrower spread with a size and character of flocs to increase the settling efficiency thereof. The type of transverse or rotary agitation imposed upon the rising stream insures the continuity of transit of flocs through the floc screen and incidentally by its sweeping action prevents floc deposits upon the bottom.

The floc treatment just described as taking place in the first two or a pair of compartments 20 and 21, represents the first stage of floc conversion, whereas the following two or a pair of compartments, 22 and 23, offer a second-stage treatment which in its operation is substantially a repetition of the first stage treatment. That is to say, the liquid with suspended flocs of a certain intermediate spread of sizes leaves the first stage through the overflow recess 29, is taken over by the paddles in the third compartment 22, rotating in the clockwise direction of arrows 58. Again under constant gentle mingling, the liquid finds its way down and through the underflow connection or passage 31 in the direction of arrows 59 into the fourth and last compartment 23, where the paddles rotate again in the counterclockwise direction of arrows carrying the numeral 60. With the aid of the paddles in this fourth compartment, the same phenomenon of condensed floc suspension recurs that has been operative in the second compartment 21. In the second stage the spread of the floc sizes then appears to be further narrowed down to a point where the emerging average size floc will have desirable or optimum settling qualities.

Stagewise floc treatment in substantially this manner affords a positive control of the desired floc formation and conditioning, and is more clearly illustrated in the simple diagram of Fig. 6 where, for the sake of simplicity, there is shown a straight row of four compartments indicated by the characters a, b, c, and d. Compartments a and b constitute the first, compartments c and d the second treatment stage. Accordingly, the spread of floc sizes in the first stage has been illustrated by the showing of a coarser or larger size of suspended solids 61, as compared with the smaller average size 62, shown in the second stage.

Reverting to Fig. 1, the floc laden stream makes its exit from the agitating or flocculating zone through the overflow passage 33 in a manner that he suspended flocs are permitted to drift substantially horizontally into a zone of quiescence or sedimentation. Due to the peculiar compact arrangement of the agitating compartments or chambers 20, 21, 22, 23 in the tank 10, this passage 33 appears to be relatively restricted as compared with the width of the sedimentation zone 18 into which the stream empties. Therefore, provision is made for the liquid stream to spread laterally over the width of the tank in the direction of arrows 63 as it enters the transverse or distributing channel 50. The baffle boards 54 of the channel wall constitute a diffusing wall inasmuch as the floc laden liquid may now pass through the interstices 54a between the boards as it feeds into the liquid body of the sedimentation zone, thus forming a number of laterally drawn out shallow streams as indicated by arrows 64 emerging from between the baffle boards, and through which the flocs may drift in the manner desired and previously described. The specific structure of the distributing or diffusing wall appears to be adapted in a peculiar and efficient manner for the purpose in question, in that it permits of the desired distribution of the floc laden liquid without ill effects upon the flocs themselves, that is to say, without impairing the structural character of the flocs with respect to the desired settling characteristics thereof. The importance of this distributing or diffusing wall is further pointed out by saying that as a partitioning structure common to each of the two operating zones or sections, namely, the solids coagmentation zone and the sedimentation zone, it divides one from the other as well as operates as a baffle to deter agitative influences in the coagmentation zone from disturbing the quiescence of the sedimentation zone while permitting flowing and drifting transfer of suspended flocs from the coagmentation zone to the sedimentation zone whereby during the transfer there is no consequential detrimental alteration of the settling characteristics of the flocs.

As disclosed in Fig. 1, the liquid leaving the last compartment 23 through overflow passage 33, due to the counterclockwise rotation of the paddles therein is given impulse to distribute along the channel towards the side 13 of the tank 10. The very spacing of the baffle boards 54 is chosen so as to produce a desired and suitable optimum of flow velocity therethrough. Other measurements of the distributing channel are also determined with a view to proper flow conditions and deposit prevention thereon. Evidently due to the extraordinary length of the slots or interstices 54a between the baffle boards 54, the flocs carried by the liquid have ample opportunity to escape therethrough at one point or another of these slots if otherwise favorable flow conditions prevail.

The agitating means or agitating mechanism can be said to be capable of embodiment in variant forms or modifications. However, preference is given to a system of vertical paddle shafts actuated through horizontal drive shafts and bevel gears. The driving arrangement as disclosed in Figures 2, 3, 4, and 5 takes advantage of the fact that two transverse rows of agitating compartments are arranged to occupy the head portion of the rectangular tank 10. The shaft 40 supplies agitating power to the first row which comprises the compartments in which the first stage floc treatment takes place. The shaft 41 supplies agitating power to the second row or second stage floc treatment.

In a practical instance it was found to be desirable to differentiate or stagger off the agitating speeds in the first and the second floc treatment stage. Therefore, assuming the proportional speed of agitation as at 100% in the first compartment, 60% was held to be desirable for the third compartment of the arrangement described.

As the measurements chosen of this apparatus appear to have an influence upon the efficiency and functioning thereof, the following design data are mentioned:

Total paddle width 15%–20% of compartment width. Paddle speed 35 to 70 ft. per min. (circumferential). Paddle shaft speeds 1.75 to 6 R. P. M. An agitating compartment may be assumed to be 13' x 13' in plan with 12' as a preferred measurement. The ratio of width to depth is suitably not more than 1:1 but preferably 1:1½ or 2. For the diffusing wall a depth or height of 6' was found practical as compared to 14' depth of the basin. Horizontal 1" slots or spaces between the baffle boards are arranged with 12" between center lines, to run across the width of the tank, and to produce flow velocities therethrough approximately equal to the velocity of the agitator blades in the last compartment 23. The measurements of the overflow recess 33 may also be computed approximately to meet this requirement of flow velocity. Incidentally, in view of the fact that some treatment plants cannot or do not maintain constant liquid level in the tank, the overflow weir should be adjustable. A clearance of 6" between the agitator paddles or equivalent members and the bottom or floor of the tank was found to enable the paddles to keep the bottom swept clean of floc deposits.

With the present design of the agitator drive mechanism, any desirable individual paddle speeds can be readily established by a corresponding choice of the bevel gear ratio. Rotation of each paddle shaft in the desired direction can be had in an extremely simple manner by arranging the small bevel gear 44 at one side or the other side respectively of the large bevel gear 43. Individual agitators can be disconnected from the main drive, for instance, by taking the small bevel gear out of mesh with its larger companion gear. Obviously some simple arrangement (not shown) could also be made for an optional reversal of the rotation of the agitators, or for variable speed regulation.

The countercurrent running arrangement of two adjoining paddles causes the floc laden liquid to pursue a substantially S-shaped path as it passes from one agitating compartment into the other. In a tangential fashion the liquid leaves the range of rotation of one paddle shaft, to merge or to be drawn tangentially into the sphere of the next paddle shaft. A transfer in this manner of the liquid from compartment to compartment is desirable for the continuity of transit and for the safeguarding of the flocs.

I claim:

1. In an apparatus for purifying liquids by flocculation of the impurities and subsequent floc sedimentation, a tank, a battery of floc treatment cells associated therewith, interconnected in a continuously progressing manner to provide for the uni-flow passage therethrough of a stream of the floc laden liquid in alternate up and down direction for stepwise floc treatment, said battery comprising an interconnected system of upstanding partition walls within said tank arranged to divide off a desired number of floc treatment cells and also arranged to provide passages at the top or bottom portion respectively of said cells, and agitating means effective to secure coagmenting floc movement in and through said cells.

2. In an apparatus for purifying liquids by flocculation of the impurities and subsequent floc sedimentation, a tank, a battery of floc treatment cells associated therewith, interconnected in a continuously progressing manner to provide for the uni-flow passage therethrough of a stream of floc laden liquid in alternate up and down direction for stepwise floc treatment, said battery comprising a system of upstanding baffle walls within said tank arranged to form parallel rows of floc treatment cells and to provide passages at the top or bottom portion respectively of said cells in such a manner as to allow the advancing stream to zigzag between the cells of one row and the cells of another row, and agitating means effective to secure desired floc movement in and through said cells.

3. Apparatus for purifying liquid by flocculation and subsequent floc sedimentation which comprises a relatively narrow floc treatment zone adapted for a floc laden stream of liquid to pass therethrough in uni-flow fashion and in generally horizontal progression for stagewise treatment thereof, a relatively wide floc sedimentation zone adapted to receive said stream of floc laden liquid, and a baffle structure transversely interposed in the flow of liquid leaving the flocculation zone for distribution thereof over the width of said sedimentation zone, the wall of the baffle having horizontally extending slotlike apertures for converting said flow into a number of horizontally expanding shallow streams to feed the sedimentation zone.

4. Apparatus for the clarification of turbid liquids having coagulated solids therein comprising in combination a tank having an inlet and outlet for liquid to be treated and through which tank the liquid is adapted to flow generally horizontally from a feed inlet at one end section to an effluent outlet at another end section of the tank; a fixed transverse substantially vertical partitioning baffle means dividing the tank into (first) an agitated solids coagmenting zone in the tank inlet section and in which suspended solids are conditioned into settleable flocs and into (second) a sedimentation zone of subsidence in the outlet section of the tank adapted for settleable flocs to deposit therein as sediment, said partitioning means being disposed between the inlet and outlet of the tank and having slotted open areas extending therethrough for the passage of liquid containing settleable flocs from the coagmenting zone into the sedimentation zone, that is from a state of agitation at one side of the baffle structure substantially directly into a state of subsidence at the other side thereof; and liquid agitating means in the coagmentation zone for causing therein mobilized suspension and the coagmentation of the solids thereof.

WILLIAM S. RUSSELL.